United States Patent
Bernal et al.

(10) Patent No.: US 8,576,449 B2
(45) Date of Patent: Nov. 5, 2013

(54) PARAMETRICALLY CONTROLLED HALFTONE SPOT FUNCTION FOR AN IRREGULAR HALFTONE GRID

(75) Inventors: Edgar A. Bernal, Webster, NY (US);
Shen-ge Wang, Fairport, NY (US);
Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 13/096,429

(22) Filed: Apr. 28, 2011

(65) Prior Publication Data
US 2012/0274985 A1 Nov. 1, 2012

(51) Int. Cl.
*H04N 1/405* (2006.01)
*H04N 1/46* (2006.01)
*G06K 15/00* (2006.01)

(52) U.S. Cl.
USPC ........... 358/3.06; 358/3.03; 358/3.3; 358/534

(58) Field of Classification Search
USPC ............. 358/3.06, 1.9, 3.09, 3.13, 1.14, 3.03, 358/3.3, 534
See application file for complete search history.

(56) References Cited

U.S. PATENT DOCUMENTS

| | | | |
|---|---|---|---|
| 4,149,183 A | 4/1979 | Pellar et al. | |
| 4,196,451 A | 4/1980 | Pellar | |
| 5,859,955 A | 1/1999 | Wang | |
| 6,798,539 B1 | 9/2004 | Wang et al. | |
| 6,989,913 B2 * | 1/2006 | Asai | 358/1.9 |
| 7,239,429 B2 | 7/2007 | Huang et al. | |
| 7,532,365 B2 | 5/2009 | Asai et al. | |
| 7,599,097 B2 * | 10/2009 | Li et al. | 358/3.06 |
| 7,619,777 B2 | 11/2009 | Lee et al. | |
| 7,626,730 B2 | 12/2009 | Tai et al. | |
| 2008/0074701 A1 | 3/2008 | Asai | |
| 2011/0038007 A1 | 2/2011 | Wang et al. | |
| 2011/0038008 A1 | 2/2011 | Wang et al. | |

OTHER PUBLICATIONS

S. Wang et al., "System and Method for Halftoning Using a Parametrically Controlled Hexagonal halftone Dot Shape Threshold Function" U.S. Appl. No. 12/647,652, filed Dec. 28, 2009.
Victor Ostromoukhov, "Pseudo-Random Halftone Screening for Color and Black&White Printing," The 9th International Congress in Non-Impact Printing Technologies/ Japan Hardcopy '93, Oct. 4-8, 1993, Yokohama, Japan, Proceedings, pp. 579-582, 1993.
Peter Fink, "PostScript Screening: Adobe Accurate Screens," Chapter 5, Mountain View, CA, Adobe Press, 1992, (15 pgs.).

\* cited by examiner

*Primary Examiner* — Charlotte M Baker
(74) *Attorney, Agent, or Firm* — Fay Sharpe LLP

(57) ABSTRACT

As set forth herein, computer-implemented methods and systems facilitate halftoning using a parametrically controlled spot function based on triangle tessellation, which in turn facilitates dot growth control of periodic halftone using an irregular seed structure. The spot function determines the shape of the halftone dot used to reproduce a given pixel. The spot function is well suited for growing halftone dots arrayed on a non-regular grid and can also be used for grids with regular order. The spot function includes adjustable parameters for controlling its sharpness and slope.

21 Claims, 7 Drawing Sheets

PARAMETRICALLY CONTROLLED HALFTONE SPOT FUNCTION FOR AN IRREGULAR HALFTONE GRID

TECHNICAL FIELD

The presently disclosed embodiments are directed toward methods and systems for printing, reproducing or displaying images. More particularly, the teachings disclosed herein are applicable to methods and apparatuses wherein clustered-dot halftoning is implemented.

BACKGROUND

Digital images may be formatted as contone (continuous tone) images having a wide range of tonal values or may be formatted as coarsely quantized images having a limited number of tonal values, such as two levels for a binary image. Digital halftoning is a process of transforming a contone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

Digital images and the resulting prints are formed of one or more colorant separations, also referred to as "color separations." A monochrome image is formed of one colorant separation, typically black. Process color images are typically constructed of cyan, magenta, yellow, and black separations. Duotone and tritone images are formed of two and three separations, respectively. Spot color images have multiple colorant separations, where at least one colorant is positioned spatially non-overlapping with other colorants. Extended colorant set images typically include the process-color colorant separations plus one or more additional colorant separations such as green, orange, violet, red, blue, white, varnish, light cyan, light magenta, gray, dark yellow, metallics, and so forth. In the present teachings, we will use the terms "color images", "color dots", "color spots", "colorant" and similar language to refer to images and marking systems with any number of colorants. The teachings herein apply particularly to any individual color separation of a digital image and resulting print, where that digital image or print can be composed of one or more separations. With the advent of computers, it is desirable for graphic artists and others to manipulate contone images and print them as halftone images. However, typical computer printers and typesetters are incapable of printing individual halftone dots in an infinite number of sizes. Instead, each halftone dot of a printed picture is in turn comprised of a collection of discrete, smaller "spots" or "pixels", which are generally the smallest marks a printer or typesetter can make.

A common halftone technique is called screening, which compares the required continuous color tone level of each pixel for each color separation with one or more predetermined threshold levels. The predetermined threshold levels are typically defined for halftone cells that are tiled to fill the plane of an image, thereby forming a halftone screen of threshold values. At a given pixel, if the required color tone level is greater than the halftone threshold level for that pixel, a "1" is generated in the halftone output, so that a colorant spot is printed at that specified pixel in the subsequent printing operation. If the required color tone at a given pixel is less than the halftone threshold level for that pixel, a "0" is generated in the halftone output, so that a colorant spot is not printed at that specified pixel in the subsequent printing operation. The output of the screening process is a binary pattern that controls the printing of multiple small spots or pixels that are printed. The printed spots can be grouped or "clustered" to form print structures that are relatively stable for a given printing process. We refer to these clusters as "clustered-dots" or "dots", and they are regularly spaced as determined by the size, shape, and tiling of the halftone cell. Conventional periodic halftone screens and halftone screen outputs can be considered as two-dimensional repeated patterns, possessing two fundamental spatial frequencies, which are completely defined by the geometry of the halftone screens.

In this manner, a "digital screen" is created as an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the halftone threshold value of the corresponding pixel in the halftone screen, and the pixel is darkened in the subsequent print image if the gray level of the contone sample is greater than the threshold value for that pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

Halftoning attempts to render images to printable form while avoiding unwanted visual texture, known as moire, and tone reproduction irregularities. The two key aspects of halftone screen design are the geometry of periodic dot placement and the shape of the halftone dots. Controlling halftone dot shape has been a lower priority in laser printers because printer pixel resolution, typically measured in rasters per inch referring to the number of smallest printable spots per unit length, has been too low. Consider, for example, the task of controlling dot shape of a 212 cell per inch (cpi) 45° halftone screen used with a printer having a resolution of 600 rasters/inch, where the halftone cell is only two rasters in height. As laser printing resolutions reach 2400 rasters/inch, and greater, controlling halftone dot shape provides a greater impact in improving a printed image.

As pixel resolution has increased with advancements in processor speed, memory capacity, printer and/or display capability, and the like, new options in halftone geometry have arisen. One area of development has been the so-called $2^{nd}$ generation stochastic screens, where nuclei (seeds) are placed in a stochastic manner (frequency modulated) up to a particular gray level, then the nuclei are grown in size (amplitude modulated) above that level. Conventional methods do not allow spot function control used in periodic clustered dot halftoning for applications such as building in robustness to marking process fluctuations.

One class of methods of growing these dots operates in the frequency domain. These "green noise"-like methods adjust a frequency spectrum while neglecting fundamental design principles relating to dot shape and touching.

A second class of $2^{nd}$ generation stochastic screens uses random seeds, then applies a fixed threshold array to control growth around the seeds. While these methods attempt to control growth in the spatial domain, where better control is possible, a fixed threshold array on random seeds tends to produce high graininess and poor touch points.

A third class attempts to use parameters to control the growth within a Voronoi tessellation formalism. These methods seem to be using a sound strategy of defining a spatial tessellation and attempting to control growth and touching between the tiles for the purposes of print-to-print stability and uniformity. But, the growth control seems to be quite suboptimal, offering much less control than is available for growing periodic dots. The lack of control not only affects stability and uniformity, but does not allow dot shaping for aesthetic purposes, such as using rounder dots for faces, squarer sharper dots for graphics, extended highlight dots (avoid touching until into the shadows) and extended shadow dots (which touch early and focus on hole shape).

There is a need in the art for systems and methods that overcome the aforementioned deficiencies.

BRIEF DESCRIPTION

In one aspect, a computer-implemented method for generating a halftone image using a parametrically controlled spot function on an irregular halftone grid comprises generating a triangle tessellation from a set of input points arranged in an irregular grid, identifying encompassing triangles, which each encompass at least one pixel, and determining distances from a given pixel to each side of the encompassing triangle in which the pixel is located. The method further comprises, for each pixel, executing the spot function using the determined distances to generate an output spot function value for each pixel, and generating a halftone image using the output spot function values.

In another aspect, a system that facilitates generating a halftone image using a parametrically controlled spot function on an irregular halftone grid comprises a processor configured to generate a triangle tessellation from a set of input points arranged in an irregular grid, identify encompassing triangles, which each encompass at least one pixel, and determine distances from a given pixel to each side of the encompassing triangle in which the pixel is located. For each pixel, the processor executes the spot function using the determined distances to generate an output spot function value for each pixel. The system further comprises a printer that prints a halftone image using the output spot function values.

In yet another aspect, a computer-implemented method for generating a halftone image using a parametrically controlled spot function on an irregular halftone grid comprises tessellating a set of input points generated using a stochastic screen, the input points being arranged in an irregular grid, and identifying encompassing triangles, which each encompass at least one pixel. The method further comprises determining distances from each pixel to each side of the encompassing triangle in which the pixel is located, normalizing the determined distances, for each pixel, executing the spot function using the normalized distances to generate an output spot function value for each pixel, generating a halftone image using the output spot function values, and printing the halftone image.

DETAILED DESCRIPTION

The above-described problem is solved by providing a parametrically controlled spot function based on triangle tessellation, which facilitates dot growth control of periodic halftone using an irregular seed structure. The spot function determines the shape of the halftone dot used to reproduce a given pixel. It is well suited for growing halftone dots arrayed on a non-regular grid and can also be used for grids with regular order. The spot function has parameters that can be adjusted to control its sharpness and slope.

Figure 1:
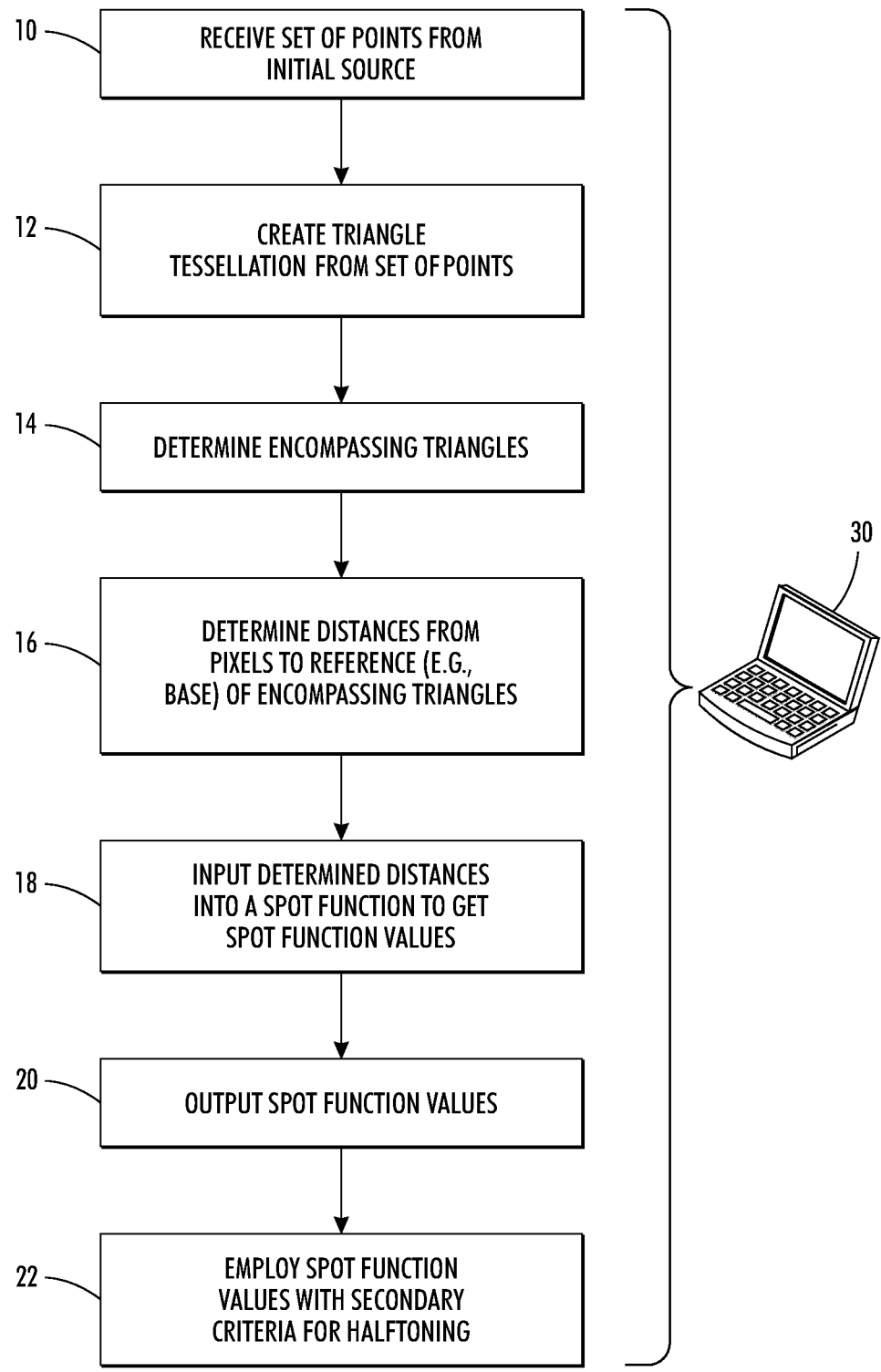
FIG. 1 illustrates a method of generating a halftone image by employing a parametrically controlled spot function, also known as a dot shape function, based on triangle tessellation.

FIG. 1 illustrates a method of generating a halftone image by employing a parametrically controlled spot function, also known as a dot shape function, based on triangle tessellation. The spot function is well suited for controlled growth of halftone spots arrayed on a non-regular grid as encountered in $2^{nd}$ generation stochastic screens. The herein-described spot function is general in that it can also be used for grids with regular order, such as conventional orthogonal halftones, hexagonally arrayed halftones, and general non-orthogonal halftones.

At 10, a set of input points or "seeds" is received or generated from an initial source, such as a stochastic screen, or by randomly perturbing locations of seeds arranged in a regular grid, or the like. Stochastic screening is a halftone process that employs a pseudo-random distribution of halftone dots and uses frequency modulation (FM) to adjust dot density to achieve a desired gray level. At 12, a triangle tessellation is generated based on the seed locations. In one embodiment, triangle parameters, such as three heights or the like, are determined for each triangle. At 14, for each pixel, an "encompassing" triangle in which the pixel resides is determined or identified. At 16, each pixel's distance from its encompassing triangle's bases is determined. That is, the distance from each pixel to each base or side of its encompassing triangle is determined or calculated. At 18, calculated distances are input into a spot function on a pixel-by-pixel basis to determine output values that are used to generate halftone thresholds. At 20, a spot function value is output for each pixel. At 22, spot function values are employed, optionally with one or more secondary criteria or considerations, to halftone an image. The method can be employed to directly halftone an image or can be used to generate a sampled version of the spot function about a collection of seeds to yield a digital halftone cell that can be used to halftone an image.

It will be appreciated that the method of FIG. 1 can be implemented by a computer 30, which comprises a processor (such as the processor 104 of FIG. 11) that executes, and a memory (such as the memory 106 of FIG. 11) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 11), a system memory (see, e.g., FIG. 11), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The temp "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
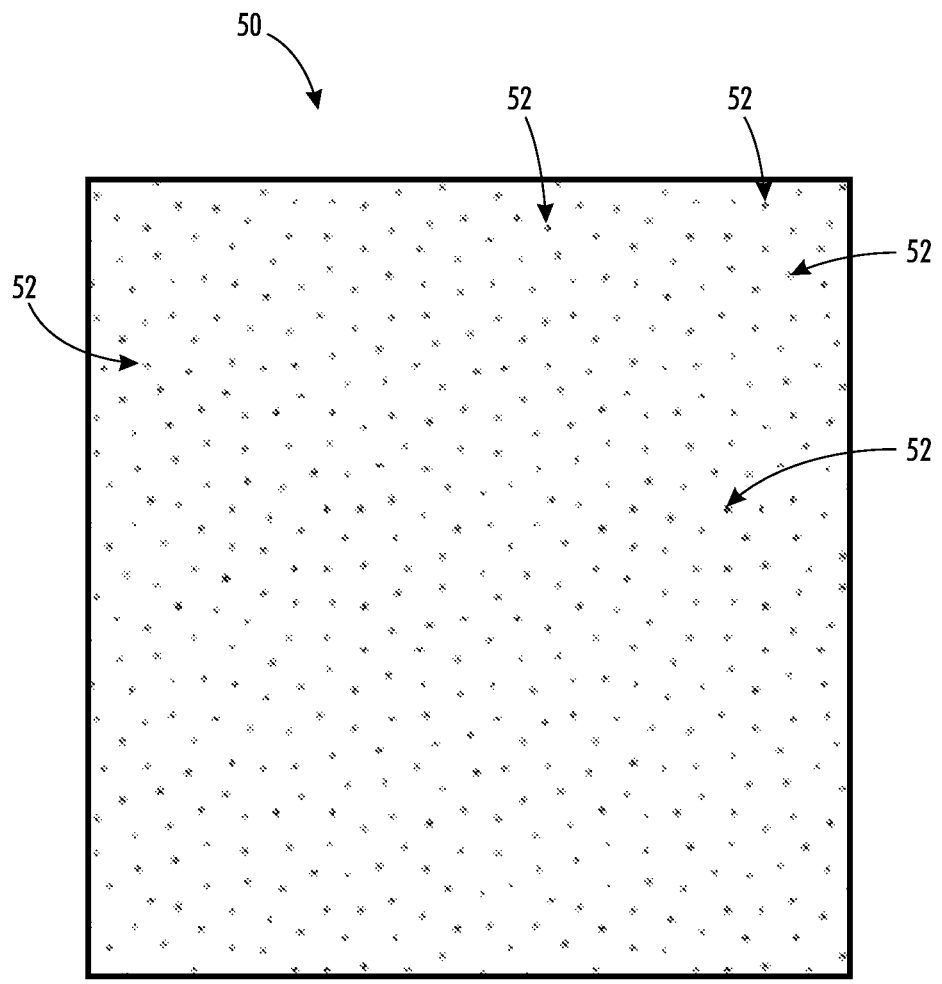
FIG. 2 shows an example of an array of seeds that are defined as "activated" or "on," according to one or more features described herein.

FIG. 2 shows an example of an array 50 of input points or seeds 52 that are defined as "activated" or "on" such as may be received or generated at step 10 (FIG. 1) according to one or more features described herein. The seeds 52 are locations that define the nuclei for growth of the spot function. The seeds can be locations on a regular grid, or irregular locations as used for $2^{nd}$ generation stochastic screens. The seeds can be defined as activated ("on") pixels on a pixel grid, or they can be represented as general spatial coordinates. In one embodiment, the seeds are generated as activated pixels using a stochastic screen halftone up to a target gray level, e.g., 15% area coverage or some other desired gray level, and the spot function grows each halftone dot about its respective seed. In optimizing the stochastic screen used for the seeds, a reduced range of frequency modulation (FM) use (e.g., 0 to 15% area coverage or some other desired range) can be employed, rather than for the full gray range as in conventional practices. When using the described method to generate a halftone cell, the cell can be treated as a hypertile so that seed distribution is not disturbed near the boundary.

Figure 3:
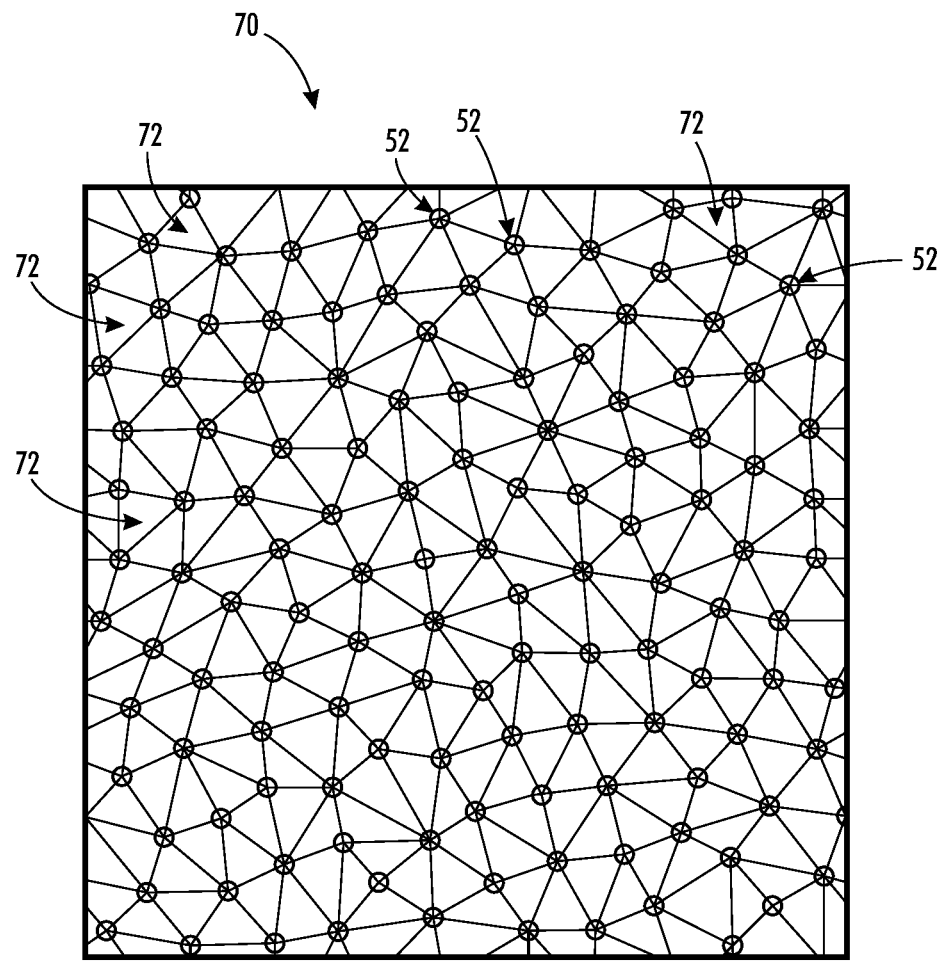
FIG. 3 shows an example of a triangle tessellation for a set of points, in accordance with one or more aspects described herein.

FIG. 3 shows an example of a triangle tessellation 70 for a set of points as may be generated at step 12 (FIG. 1), in accordance with one or more aspects described herein. Given the seeds 52, a triangle tessellation is defined or generated based on seed locations. Triangle parameters, such as three heights, are determined for each triangle 72. According to one example, the pixel area that contains the seed locations is divided into triangles 72. The vertices of the triangles are the dot seeds 52. Every dot seed 52 is used as a vertex. By definition of a tessellation, the triangles completely fill the space and do not overlap. If the seeds form a particular periodic structure such as a hexagonal grid, then the tessellation would be regular and formed of congruent triangles. In the case of irregular grids, the tessellation would be irregular and formed of non congruent triangles.

There are multiple options for forming the triangle tessellation. For example, a Delaunay triangulation algorithm or technique may be employed, in which a circumcircle of any triangle does not contain any other point. The Delaunay triangulation maximizes the minimum angle between vertices thereby avoiding skinny triangles. It may be employed for halftoning applications for that reason. Delaunay triangulation is the dual graph of the Voronoi tessellation, and the described method is naturally suited to operate using the dual Delaunay representation. Compared to any other triangulation of points, the smallest angle in the Delaunay triangulation is at least as large as the smallest angle in any other. However, the Delaunay triangulation does not necessarily minimize the maximum angle.

In another example, a greedy triangulation algorithm or technique is employed, which minimizes the total edge length of the resulting triangulation by adding the shortest internal diagonal to the triangulation at each step. According to another aspect, a polygon triangulation algorithm or technique is used, which decomposes the space into monotonic polygons that can be triangulated efficiently. In yet another example, a radial sweep algorithm or technique is employed, in which the central point of the set is connected to other points radially. Triangles are then formed by connecting radial edges together.

Figure 4:
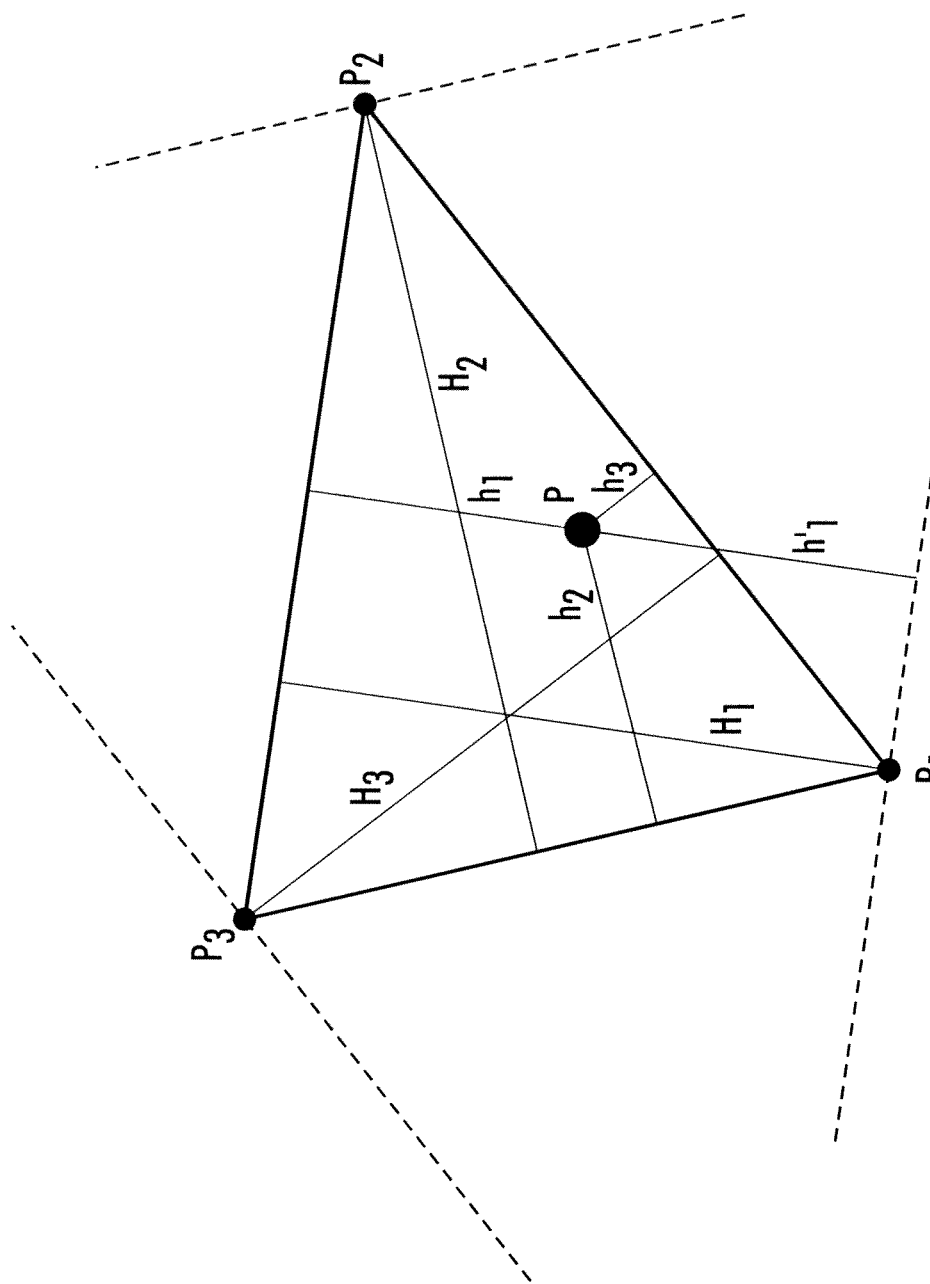
FIG. 4 illustrates a triangle having vertices $P_1 P_2 P_3$ and which encompasses a pixel P, in accordance with various aspects described herein.

FIG. 4 illustrates a triangle 72 having vertices $P_1P_2P_3$ and which encompasses a pixel P such as is determined at step 14 (FIG. 1), in accordance with various aspects described herein. The triangle has heights $H_1$, $H_2$, and $H_3$, as well as pixel-intersecting heights $h_1$, $h'_1$, $h_2$, and $h_3$. For a given pixel P, the triangle in which it resides is determined. Once encompassing triangles are defined, relatively straightforward geometric relationships can be used to determine useful triangle parameters, such as triangle heights $H_1$, $H_2$ and $H_3$, etc, as will be appreciated by those of skill in the relevant arts.

There are several contemplated options for determining or identifying the encompassing triangles. For instance, a crossing number technique or algorithm may be employed, which follows a ray that passes through the pixel and identifies the triangle whose sides intersect the ray twice, once on each side of the pixel P. According to another aspect, a winding number technique or algorithm is employed, which counts the number of times the triangle winds around the pixel. If the winding number is 0, the point is outside the triangle; otherwise, it is inside.

It will be appreciated that the step of determining encompassing triangles may optionally be omitted for seed points that lie on a pixel (e.g., "on" or "activated" pixels) rather than seed points that have a spatial coordinate not necessarily congruent with a pixel grid in which the pixels lie. That is, there is not a need to determine the encompassing triangle of a pixel if the pixel is located on a vertex of one or more triangle(s).

For each pixel, distances from its encompassing triangle vertices are determined, such as is discussed above with regard to step 16 of FIG. 1. The distances are determined from projections onto the triangle altitudes, or similarly, distances to the respective bases. An altitude of a triangle is a straight line through a vertex and perpendicular to the opposite side. The length of the altitude is the height with respect to the given vertex. The opposite side is called the base of the altitude. The distances $h_1$, $h_2$ and $h_3$ are the distances from P to their respective bases, which are opposite $P_1$, $P_2$ and $P_3$ respectively. To implement a well-behaved (e.g., not fragmenting with controlled growth) spot function, the described method uses normalized heights (distances): $h_1/H_1$, $h_2/H_2$ and $h_3/H_3$, in accordance with various aspects.

The determined distances are employed to determine the value of a spot function that generates halftone thresholds. That is, the determined distances are input into the spot function, such as is discussed with regard to step 18 of FIG. 1. The spot function has parameters that can be adjusted to control its sharpness and slope. In one embodiment, the spot function is a weighted sum of three cosines that are functions of the three respective distances. Algebraic powers of the distances control sharpness of each dot touch point with its neighboring dots. Cosine weights control sequencing the touches, such that contact with neighboring dots can occur at different gray levels thereby avoiding instability that occurs for simultaneous touching. The spot function itself can be used to halftone an image, or a sampled version of the spot function can be applied as a threshold array for efficient implementation in a printer. Once all six distance values have been computed, the Q value of the pixel P is computed according to the following formula:

$$Q = a_1 \cos(\pi(2h_1/H_1)) + a_2 \cos(\pi(2h_2/H_2)) + a_3 \cos(\pi(2h_3/H_1)) \quad (1)$$

where $a_1$ are parameters that control the elongation of the dot along the direction defined by $H_i$. Note that since cosine is a symmetric function about $\pi$, the value of Q is the same regardless of whether the distances $h_i$ are calculated with respect to a triangle side or to a line parallel to that side passing through the opposite vertex. For example, the value of Q would be the same if $h'_1 = H_1 - h_1$ is used instead of $h_1$.

If control over the roundness of the dot sides and the sharpness of corner touch points is desired, a new set of parameters $\gamma_i$ can be introduced:

$$Q = a_1 \cos(\pi(2h_1/H_1)^{\gamma 1}) + a_2 \cos(\pi(2h_2/H_2)^{\gamma 2}) + a_3 \cos(\pi(2h_3/H_1)^{\gamma 3}) \quad (2)$$

Note that when $\gamma_i \neq 0$ for some i, the choice over how to measure $h_i$ is no longer arbitrary since the symmetry of Q with respect to $h_i$ is lost. In this case, the selection is constrained to be the distance between the point and whichever line is closest to it, be it the triangle side or its imaginary parallel replication passing through the opposite triangle vertex.

Another level of control can be enabled by inverting the spot function, such that:

$$Q = -(a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})) \quad (3)$$

The inversion allows for well controlled "holes," which can be desirable for dark image subject matter.

According to another aspect, data normalization is an additional step that can be performed with spot functions. Once all pixels in the matrix are processed, the resulting entries are shifted and scaled to fit the data range, such as [0,255] for an 8-bit system or [0,1023] for a 10-bit image path.

According to related aspects, where the spot function has identical or nearly identical output values for multiple pixels in a dot, the order of the multiple pixels can be determined by any of a number of secondary criteria. For, instance a marking process or imager may mark pixels in a more consistent manner if pixels are preferentially added to a side, such as the lead edge, or trail edge of the dot as it moves through the process or start-of-scan or end-of-scan side of a dot relative to a laser imager scanning direction. For instance, angular considerations can be used to rank pixels. That is, to have minimal displacement of the centroid of the dot from gray level to gray level, pixels with nearly identical dot shape function values are sometimes selected by spiraling around the dot in quadrant (or hextant, etc.) steps. As another example, printed dot consistency is sometimes achieved by preferentially growing a dot in a vertical or horizontal direction where pixels having nearly identical spot function values are ranked to provide more growth in the preferred direction. In some cases, the fill order for pixels of nearly identical spot function values could be random, or selected by any of a number of other criteria.

FIGS. 5-10 illustrate various examples of halftone images generated using the described parametrically controlled spot function. The examples use an average dot-to-dot space of 14 pixels at 2400 spots per inch (spi), which is equivalent to 170 halftone cells per inch (cpi). 128 seeds were used within a 128×128 halftone cell.

Figure 5:
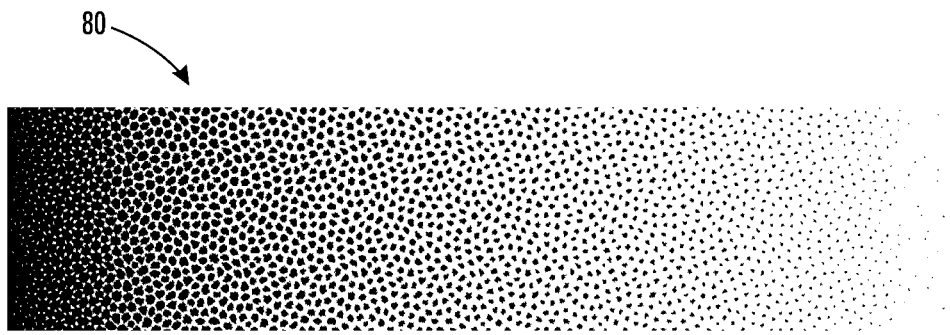
FIG. 5 illustrates a halftone image generated using equation (2), wherein $a_i=1$, and $\gamma_i=1$.

FIG. 5 illustrates a halftone image 80 generated using equation (2), wherein $a_i=1$, and $\gamma_i=1$.

Figure 6:
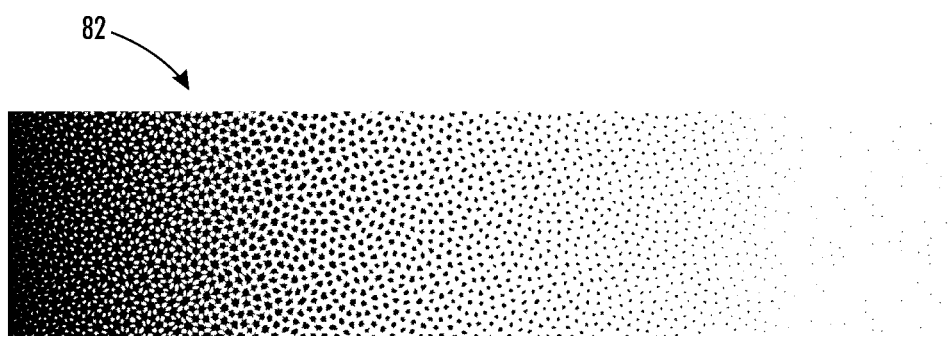
FIG. 6 illustrates a halftone image generated using equation (2), wherein $a_i=1$, and $\gamma_i=0.6$.

FIG. 6 illustrates a halftone image 82 generated using equation (2), wherein $a_i=1$, and $\gamma_i$32 0.6. It will be noted that when $\gamma_i$ is less than approximately 1, a pincushion effect is achieved, which can improve stability in some marking processes.

Figure 7:
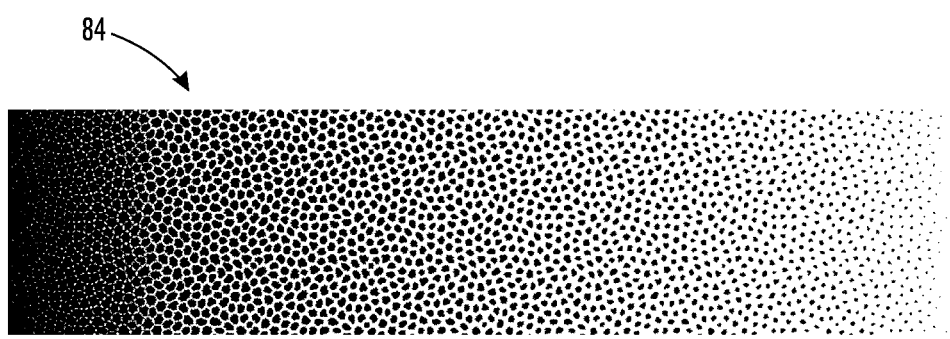
FIG. 7 illustrates a halftone image generated using equation (2), wherein $a_i=1$, and $\gamma_i=1.5$.

FIG. 7 illustrates a halftone image 84 generated using equation (2), wherein $a_i=1$, and $\gamma_i=1.5$. It will be noted that when $\gamma_i$ is greater than approximately 1, the generated dots are generally rounder and delay contact at corners, which may be preferred for some marking processes or used for subject matter that is primarily highlights.

Figure 8:
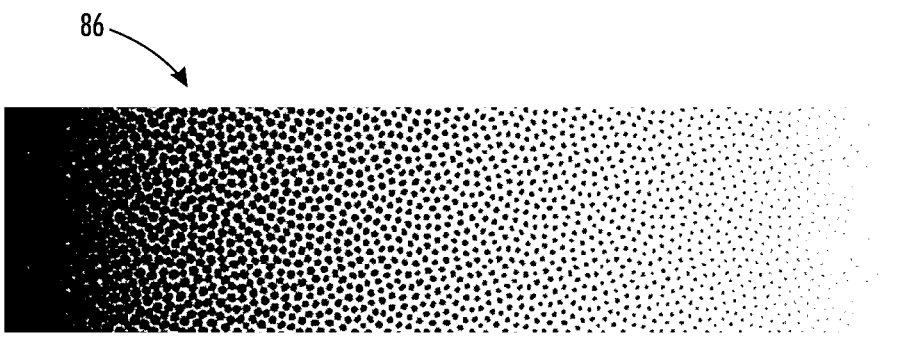
FIG. 8 illustrates a halftone image generated using equation (2), wherein $a_i$ is varied with $H_i$, and $\gamma_i=1$.

FIG. 8 illustrates a halftone image 86 generated using equation (2), wherein $a_i$ is varied with $H_i$, and $\gamma_i=1$.

Figure 9:
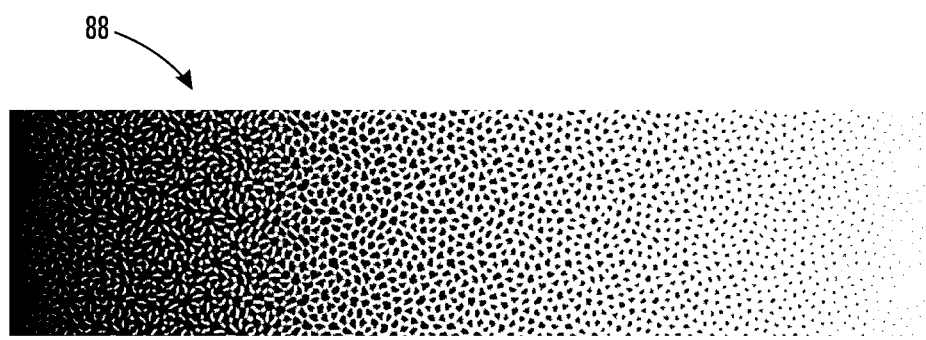
FIG. 9 illustrates a halftone image generated using equation (2), wherein $a_i$ is varied inversely and proportionally with $H_i$, and $\gamma_i=1$.

FIG. 9 illustrates a halftone image 88 generated using equation (2), wherein $a_i$ is varied inversely and proportionally with $H_i$, and $\gamma_i=1$.

Figure 10:
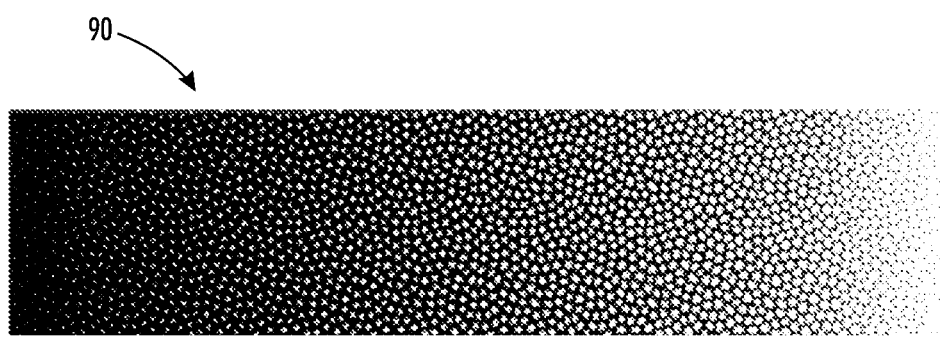
FIG. 10 illustrates a halftone image generated using equation (3), wherein $a_i=1$, and $\gamma_i=1$.

FIG. 10 illustrates a halftone image 90 generated using equation (3), wherein $a_i=1$, and $\gamma_i=1$. It will be noted that this approach yields well-defined "holes.". This parameterization can be used for dark subject matter.

Figure 11:
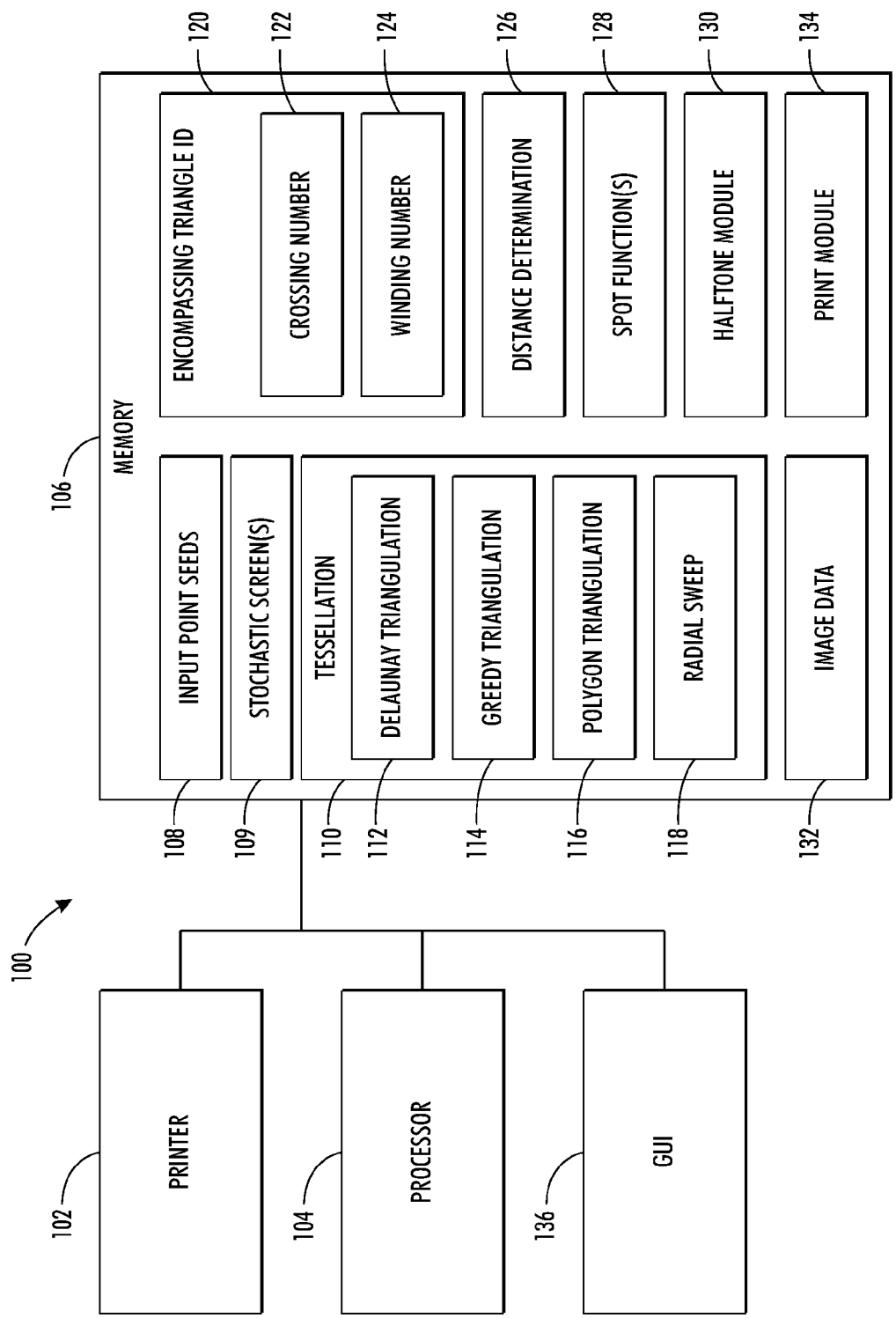
FIG. 11 illustrates a system that facilitates generating a halftone image by employing a parametrically controlled spot function based on triangle tessellation.

FIG. 11 illustrates a system 100 that facilitates generating a halftone image by employing a parametrically controlled spot function based on triangle tessellation. The system comprises a print engine 102 that is coupled to a processor 104 that executes, and a memory 106 that stores computer-executable instructions for performing the various functions, methods, techniques, steps, and the like described herein. The processor 104 and memory 106 may be integral to each other or remote but operably coupled to each other. In another embodiment, the processor 104 and memory 106 are integral to the printer 102. In another embodiment, the processor and memory reside in a computer (e.g., the computer 30 of FIG. 1) that is operably coupled to the printer 102.

As stated above, the system 100 comprises the processor 104 that executes, and the memory 106 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

A set of input points or "seeds" 108 is received or generated from an initial source, such as a stochastic screen 109, or by randomly perturbing locations of seeds arranged in a regular grid, or the like, generated by the processor 104 from an input image scanned by the printing device 102, or from some other suitable source (i.e., the seeds need not come from an input image). The input points 108 and the stochastic screen are stored in the memory 106. The processor 104 executes a triangle tessellation module 110 to generate a triangle tessellation based on the seed locations. For instance, the input points or seeds 108 may be arranged in an irregular or non-uniform grid-like pattern, such as is shown in FIG. 2. The tessellation module 110 includes one or more of a Delaunay triangulation module 112. A greedy triangulation module 114, a polygon triangulation module 116, a radial sweep triangulation module 118, or any other suitable triangulation module.

For example, using the Delaunay triangulation module 112, a circumcircle of any triangle is constrained to pass through the three input point seeds forming the triangle without circumscribing any other point seed. The Delaunay triangulation maximizes the minimum angle between vertices thereby avoiding skinny triangles. In another example, the greedy triangulation module 114 is employed, which minimizes the total edge length of the resulting triangulation by adding the shortest internal diagonal to the triangulation at each step. According to another aspect, a polygon triangulation module 116 is executed, which decomposes the space into monotonic polygons that can be triangulated efficiently.

In yet another example, a radial sweep module 118 is employed, in which the central point of the set is connected to other points radially. Triangles are then formed by connecting radial edges together.

The processor 104 executes an encompassing triangle identification module 120 that identifies "encompassing" triangles in which a pixel resides on a pixel-by-pixel basis. For instance, a crossing number module 122 can be executed, which follows a ray that passes through a given pixel and identifies the triangle whose sides intersect the ray twice, once on each side of the pixel P. According to another aspect, a winding number module 124 is executed, which counts the number of times the triangle winds around the pixel. If the winding number is 0, the point is outside the triangle; otherwise, it is inside.

The processor 104 executes a distance determination module 126 that determines or calculates each pixel's distance from its encompassing triangle's bases. That is, the distance from each pixel to each base or side of its encompassing triangle is determined or calculated. The distance determination module 126 also calculates or determines three heights for each triangle, including a height from each vertex to its opposite base or side. In this manner, six height or distance values are calculated: three pixel heights $h_1$, $h_2$, and $h_3$, and three triangle heights $H_1$, $H_2$, and $H_3$.

Once the six height values are determined for each pixel, the processor inputs the height values into a spot function (see, e.g., equations (1), (2), and/or (3) described with regard to the preceding Figures) on a pixel-by-pixel basis to determine output values that are used to generate halftone thresholds. In one example, the spot function is executed for each pixel as soon as the height values are available. In another example, the spot function is executed for all pixels once all pixels' height values have been determined. The processor 104 then executes a halftone module 130 that uses the spot function output values for each pixel, optionally with one or more secondary criteria or considerations, to halftone an image. Image data 132 is stored in the memory 106 and may include input image data from which an input point seed grid is generated, intermediate image data that is generated at various points during the described process, output image data such as halftone image data, etc. The output image data is provided to a print module 134 that, when executed y the processor 104, generates a set of commands or instructions that are executed by the processor 104 and/or the printer 102 to print the halftone image. In another embodiment, the output halftone image is displayed graphically on a graphical user interface 136 that may be integral to the printer 102, remote but operably coupled thereto, or may reside on a computer such as the computer 30 of FIG. 1. In this manner, the system 100 can be employed to directly halftone an image or can be used to generate a sampled version of the spot function about a collection of seeds to yield a digital halftone cell that can be used to halftone an image.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for generating a halftone image using a parametrically controlled spot function on an irregular halftone grid, comprising:

generating a triangle tessellation from a set of input points arranged in an irregular grid;

identifying encompassing triangles, which each encompass at least one pixel;

determining distances from a given pixel to each side of the encompassing triangle in which the pixel is located;

for each pixel, executing the spot function using the determined distances to generate an output spot function value for each pixel; and generating a halftone image using the output spot function values.

2. The method according to claim 1, wherein the triangle tessellation is generated using a Delaunay triangulation algorithm.

3. The method according to claim 1, wherein the triangle tessellation is generated using a greedy triangulation algorithm, which minimizes a total edge length of a resulting triangulation by adding a shortest internal diagonal to the triangulation at each step of the triangle tessellation generation.

4. The method according to claim 1, wherein the triangle tessellation is generated using a polygon triangulation algorithm, which decomposes the irregular grid of input points into polygons that are subsequently triangulated.

5. The method according to claim 1, wherein the triangle tessellation is generated using a radial sweep algorithm in which input points are connected radially to neighbors iteratively until the triangle tessellation is complete.

6. The method according to claim 1, wherein identifying encompassing triangles comprises employing a crossing number algorithm that follows a ray that passes through the at least one pixel and identifies a triangle whose sides pass through the ray twice, once on each side of the at least one pixel.

7. The method according to claim 1, wherein identifying encompassing triangles comprises employing a winding number algorithm that counts a number of times a triangle winds around the at least one pixel.

8. The method according to claim 1, wherein the determined distances are pixel-intersecting heights, which are the distances $h_1$, $h_2$ and $h_3$ from the at least one pixel to respective bases of the encompassing triangle in which the at least one pixel is located, wherein the encompassing triangle has heights $H_1$, $H_2$, and $H_3$, and wherein the spot function employs normalized heights $h_1/H_1$, $h_2/H_2$ and $h_3/H_3$.

9. The method according to claim 8, wherein the spot function is defined as:

$$Q = a_1 \cos(\pi(2h_1/H_1)) + a_2 \cos(\pi(2h_2/H_2)) + a_3 \cos(\pi(2h_3/H_1)) \quad (1)$$

wherein $a_i$ are parameters that control the elongation of a dot along the direction defined by $H_i$, and Q is the output value of the spot function.

10. The method according to claim 8, wherein the spot function is defined as:

$$Q = a_1 \cos(\pi(2h_1/H_1)^{\gamma_1}) + a_2 \cos(\pi(2h_2/H_2)^{\gamma_2}) + a_3 \cos(\pi(2h_3/H_1)^{\gamma_3}) \quad (2)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points.

11. The method according to claim 10, wherein the spot function is inverted such that:

$$Q = -(a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3})) \quad (3).$$

12. A processor configured to execute computer-executable instructions for performing the method of claim 1, the instructions being stored on a non-transitory computer-readable medium.

13. A system that facilitates generating a halftone image using a parametrically controlled spot function on an irregular halftone grid, comprising:

a processor configured to:

generate a triangle tessellation from a set of input points arranged in an irregular grid;

identify encompassing triangles, which each encompass at least one pixel;

determine distances from a given pixel to each side of the encompassing triangle in which the pixel is located;

for each pixel, execute the spot function using the determined distances to generate an output spot function value for each pixel; and a printer that prints a halftone image using the output spot function values.

14. The system according to claim 13, wherein the processor, when generating the triangle tessellation, uses at least one of:

a Delaunay triangulation algorithm;

a greedy triangulation algorithm, which minimizes a total edge length of a resulting triangulation by adding a shortest internal diagonal to the triangulation at each step of the triangle tessellation generation;

a polygon triangulation algorithm, which decomposes the irregular grid of input points into polygons that are subsequently triangulated; and a radial sweep algorithm in which input points are connected radially to neighbors iteratively until the triangle tessellation is complete.

15. The system according to claim 13, wherein the processor, when identifying encompassing triangles, employs at least one of:

a crossing number algorithm that follows a ray that passes through the at least one pixel and identifies a triangle whose sides pass through the ray twice, once on each side of the at least one pixel; and a winding number algorithm that counts a number of times a triangle winds around the at least one pixel.

16. The system according to claim 13, wherein the determined distances are pixel-intersecting heights, which are the distances $h_1$, $h_2$ and $h_3$ from the at least one pixel to respective bases of the encompassing triangle in which the at least one pixel is located, wherein the encompassing triangle has heights $H_1$, $H_2$, and $H_3$, and wherein the spot function employs normalized heights $h_1/H_1$, $h_2/H_2$ and $h_3/H_3$.

17. The system according to claim 13, wherein the spot function is defined as:

$$Q = a_1 \cos(\pi(2h_1/H_1)) + a_2 \cos(\pi(2h_2/H_2)) + a_3 \cos(\pi(2h_3/H_1)) \quad (1)$$

where $a_i$ are parameters that control the elongation of a dot along the direction defined by $H_i$, and Q is the output value of the spot function.

18. The system according to claim 13, wherein the spot function is defined as:

$$Q = a_1 \cos(\pi(2h_1/H_1)^{\gamma_1}) + a_2 \cos(\pi(2h_2/H_2)^{\gamma_2}) + a_3 \cos(\pi(2h_3/H_1)^{\gamma_3}) \quad (2)$$

where $a_i$ are parameters that control the elongation of a dot along the direction defined by $H_i$, where Q is the output value of the spot function, and where $\gamma_i$ is a parameter that governs roundness of the dot sides and the sharpness of corner touch points.

19. The system according to claim 18, wherein the spot function is inverted such that:

$$Q = -(a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3})) \quad (3).$$

20. A computer-implemented method for generating a halftone image using a parametrically controlled spot function on an irregular halftone grid, comprising:
   tessellating a set of input points generated using a stochastic screen, the input points being arranged in an irregular grid;
   identifying encompassing triangles, which each encompass at least one pixel;
   determining distances from each pixel to each side of the encompassing triangle in which the pixel is located;
   normalizing the determined distances;
   for each pixel, executing the spot function using the normalized distances to generate an output spot function value for each pixel;
   generating a halftone image using the output spot function values; and
   printing the halftone image.

21. The method according to claim 20, wherein the spot function is defined as:

$$Q = a_1 \cos(\pi(2h_1/H_1)^{\gamma_1}) + a_2 \cos(\pi(2h_2/H_2)^{\gamma_2}) + a_3 \cos(\pi(2h_3/H_1)^{\gamma_3}) \quad (2)$$

where $a_i$ are parameters that control the elongation of a dot along the direction defined by $H_i$, where Q is the output value of the spot function, and where $\gamma_i$ is a parameter that governs roundness of the dot sides and the sharpness of corner touch points.

* * * * *